Figure 1:
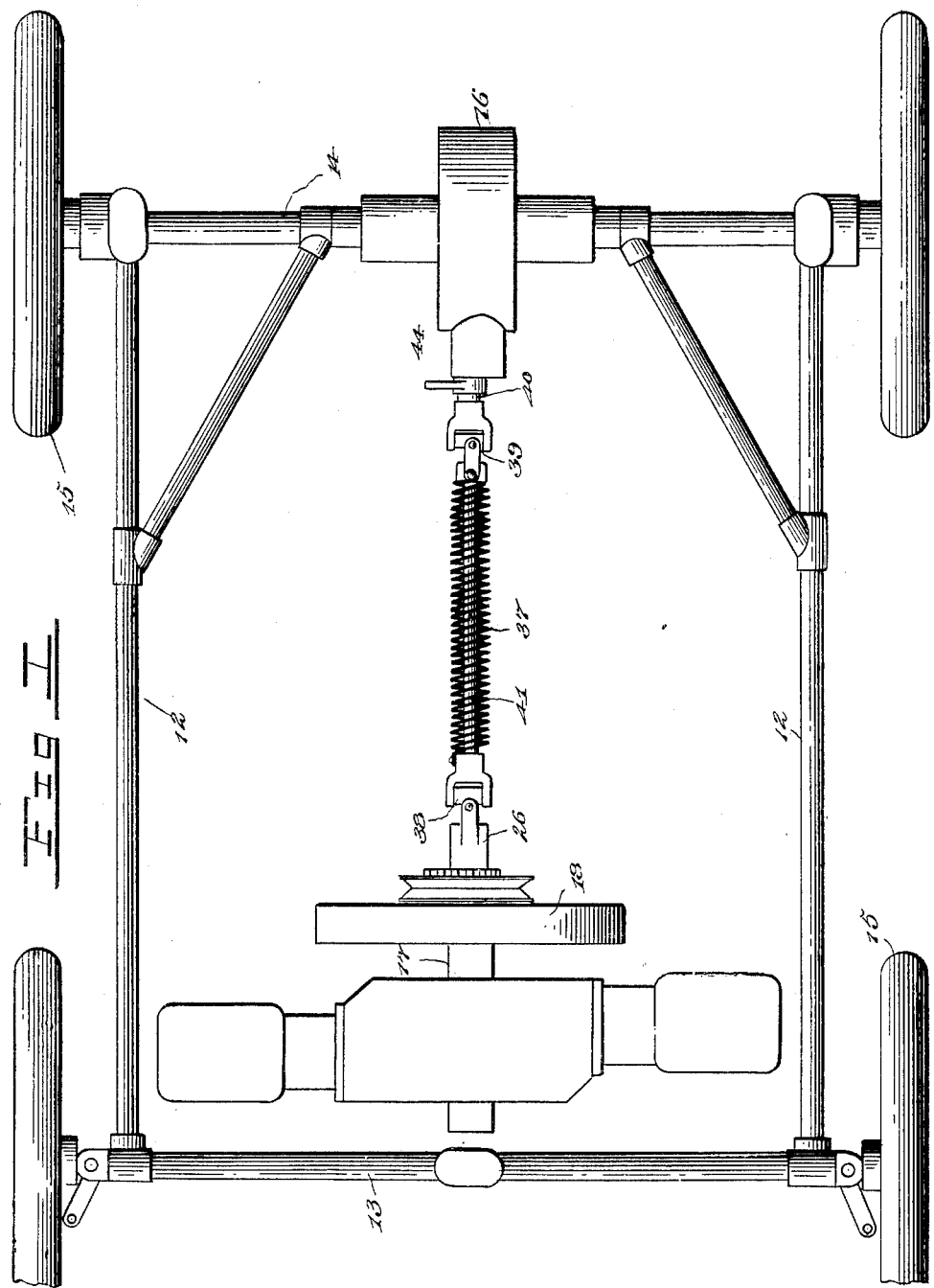

No. 675,425. Patented June 4, 1901.
T. L. & T. J. STURTEVANT.
MOTOR VEHICLE.
(Application filed Jan. 17, 1901.)
(No Model.) 4 Sheets—Sheet 1.

Witnesses:
John Maupin

Inventors:
Thomas L. Sturtevant
Thomas J. Sturtevant
by Henry Calver
Attorney.

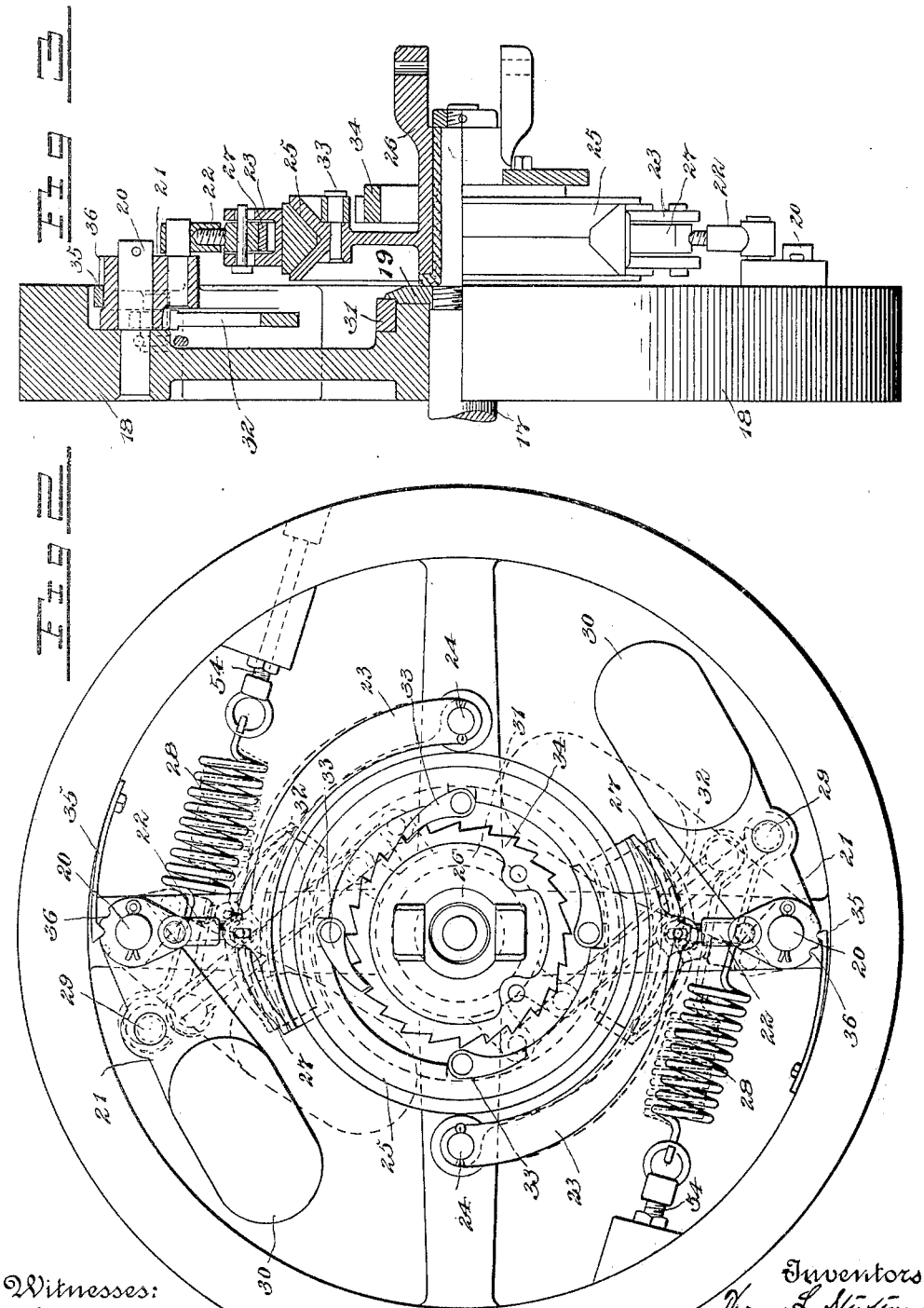

No. 675,425. Patented June 4, 1901.
T. L. & T. J. STURTEVANT.
MOTOR VEHICLE.
(Application filed Jan. 17, 1901.)
(No Model.) 4 Sheets—Sheet 3.
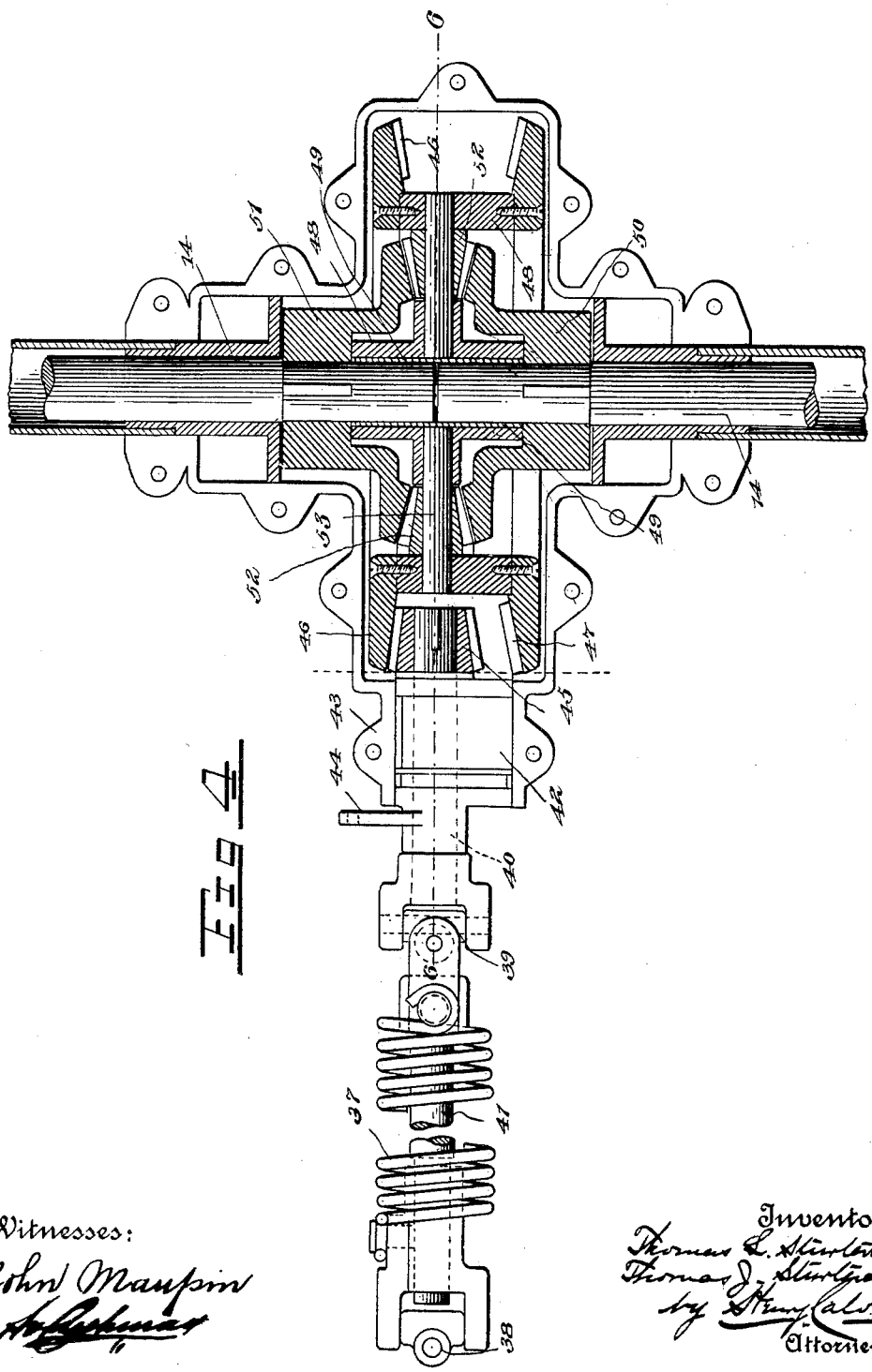

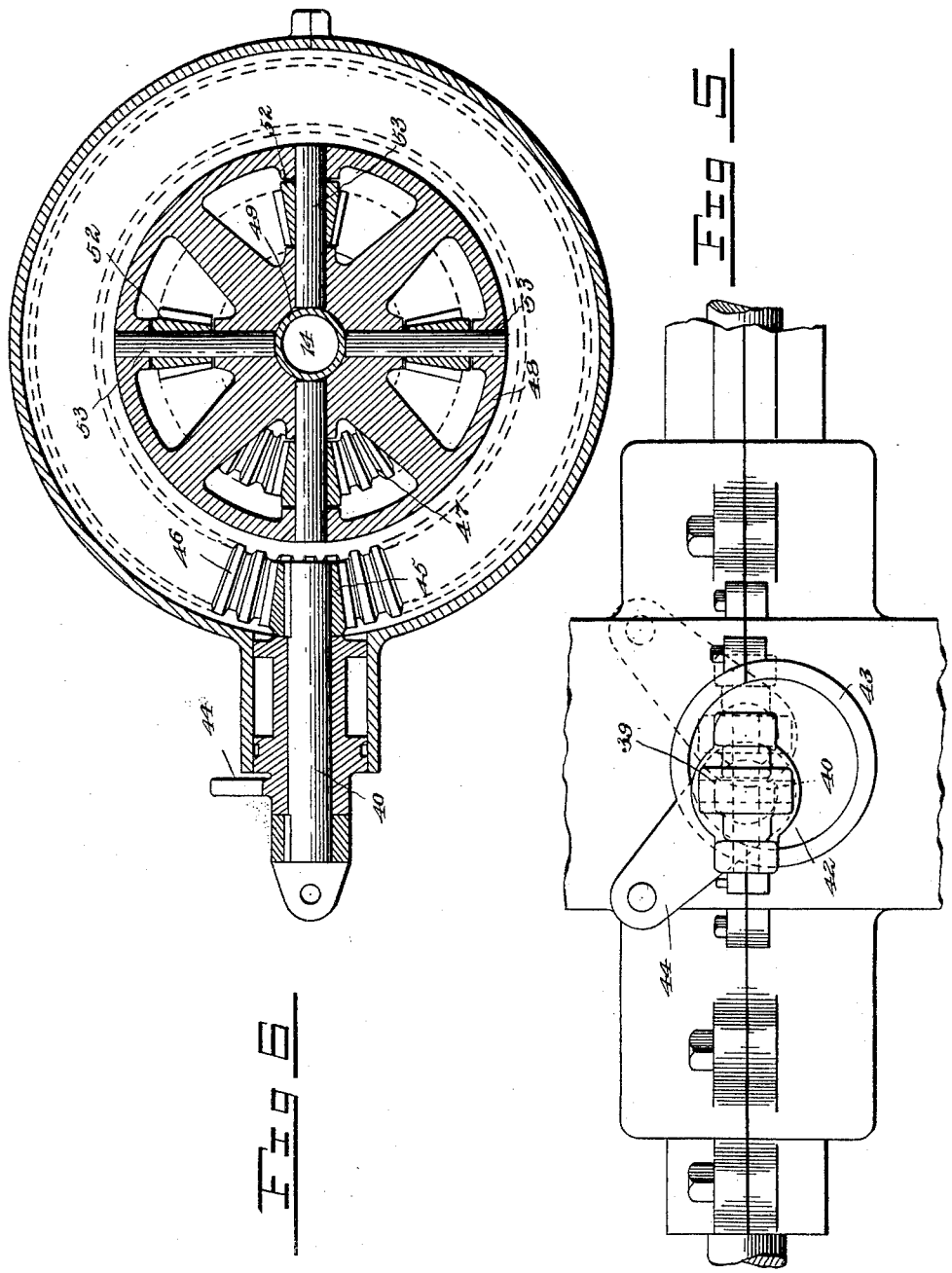

UNITED STATES PATENT OFFICE.

THOMAS L. STURTEVANT, OF QUINCY, AND THOMAS J. STURTEVANT, OF NEWTON CENTER, MASSACHUSETTS.

MOTOR-VEHICLE.

SPECIFICATION forming part of Letters Patent No. 675,425, dated June 4, 1901.

Application filed January 17, 1901. Serial No. 43,672. (No model.)

*To all whom it may concern:*

Be it known that we, THOMAS L. STURTEVANT, residing at Quincy, in the county of Norfolk, and THOMAS J. STURTEVANT, residing at Newton Center, in the county of Middlesex, State of Massachusetts, citizens of the United States, have invented certain new and useful Improvements in Motor-Vehicles, of which the following is a specification, reference being had therein to the accompanying drawings.

Our invention relates to motor-vehicles or automobiles, and has for one of its objects to provide a power-transmitting mechanism of such construction that the motor will be so connected with the driven parts that any sudden accession of load beyond the capacity of the motor running at its normal speed will cause an automatic uncoupling of the motor and the driven parts and enable the motor to run light and uncoupled until it has again reached its normal or working speed, when it will be automatically coupled to the part to be driven, such speeding up of the uncoupled motor resulting in the storing of power or momentum in its fly-wheel or other moving parts sufficient to overcome the increased load resistance. To effect this automatic intermittent uncoupling and coupling of the motor and its driven part, we have devised a centrifugal clutch mechanism of novel construction, which is so connected and combined with the motor and other working parts of the vehicle as to operate very quickly in coupling and uncoupling after it has been brought into action, but which is preferably provided with retarding or temporary locking means, which renders it less sensitive to centrifugal force than it otherwise would be, and therefore slow in making initial change movements, but, after starting, quick in moving from one position to another, and therefore somewhat irregular or intermittent in operation, as distinguished from an ordinary regularly-operated centrifugal clutch.

A further object of our invention is to provide elastic or flexible driving connections between the motor and the driven parts, which will prevent any sudden strain on the vehicle structure or jerking of the power-transmitting devices when the clutch automatically couples the rapidly-running motor with the parts to be driven.

A still further object of the invention is to provide a reversing-gear and a novel arrangement of driving-gears and connections to permit running the vehicle forward or backward.

Referring to the accompanying drawings, Figure 1 is a plan view of so much of an automobile structure as will illustrate our invention, the driving and power transmitting connections between the motor and the driven part being shown. Fig. 2 is a side view of the motor fly-wheel and clutch mechanism. Fig. 3 is a sectional view of the clutch shown in Fig. 2. Fig. 4 is a detail sectional view of the power-transmitting connections and reversing and driving gears. Fig. 5 is an end view of the reversing-gear lever and drive-gear bearing. Fig. 6 is a sectional view on line 6 6, Fig. 4.

Referring to the drawings, 12 indicates a frame of any suitable construction having front and rear axles 13 14 and their wheels 15, the driving-wheels on the rear axles 14 being secured thereto, as is usual. Mounted on said frame is a motor of any desired type—electric, steam, or gas—though preferably a motor or engine of the variable-speed type is used, for reasons that will appear hereinafter, said motor having a driving-shaft 17, provided with a fly-wheel 18, secured to it by means of a nut 19, as shown in Fig. 3. Pivoted on pins 20, projecting from the said fly-wheel, are bell-crank levers 21, which are connected by means of adjustable links 22 with clutch-shoes 23, pivoted at 24 to the fly-wheel, the short arms of said levers and said links forming toggle connections by which the said shoes are thrown in and out of clutching position, said shoes 23 engaging when in a clutching position a clutch-wheel 25, which is secured to or formed integral with the power-transmitting shaft 26. The said clutch-shoes 23 have a loose connection with the links 22, and stiff springs 27 are preferably interposed between the ends of the links 22 and the shoes 23 to provide elastic or spring gripping clutch-shoes. The said levers 21 are connected by springs 28, engaging pins 29 on the bell-crank levers 21 with the rim or other part of the fly-wheel in such a manner that said springs will exert a constant inward pull on said bell-crank levers 21, said springs having an adjustable connection by means of the screws 54 with the rim of the fly-wheel, so that their pull may be varied. When the motor is running, the tendency of the bell-crank levers 21, which are provided with the weights 30, is to fly outwardly under centrifugal force and because of their bell-crank form and the adjustable connecting-links 22 to force the shoes with a spring-grip against the clutch-wheel 25 and couple the motor-shaft 17 with the power-transmitting shaft 26. It will be seen that the springs 28 are so connected with the bell-crank levers 21, relative to the pivotal points of said levers, that their pull on the latter is greatest when the levers are in their inner positions, this being due to the fact that the levers when in such positions are at their points of greatest leverage with respect to said springs, (see dotted lines, Fig. 2,) which will therefore exert their maximum pull on the levers, though the springs are not at such times under greatest tension, and that as the weights 30 move outwardly under the action of centrifugal force the leverage at the points of connection of the springs with the said levers shortens and the effective pull of said springs diminishes rapidly on account of this shortening leverage, even though the springs are being slightly extended and the tension thereof slightly increased. The result of this arrangement is that the weighted arms of the levers exert their maximum power in forcing the clutch-shoes 23 against the wheel 25, when in their outer positions and that the pull of the springs 28 is greatest when the said weighted arms of said levers are in their inner positions, owing to the lengthening leverage of the said springs relative to said arms, thereby providing a construction in which the clutch mechanism attains its greatest efficiency at a time when it is most desired and insuring such a gripping action of the clutch-shoes as to reduce danger of slipping of the shoes on the clutch-ring to a minimum, as also augmenting the differential clutching and unclutching action. It will be seen, therefore, that when the motor is running at working speed the weighted arms of the levers 21 will be thrown out to the positions shown in full lines in Fig. 2 and the motor-shaft and power-transmitting shaft will be coupled together. If an accession of load causes the motor to slow down, so that the centrifugal force becomes less than is necessary to overcome the tendency of the said weighted arms to move inward, said arms will be drawn by the springs 28 to their inner positions and uncouple the motor-shaft from the power-transmitting shaft. This action is entirely automatic, and the parts may be so adjusted as to cause the automatic intermittent coupling and uncoupling of the motor at any predetermined speed, so that if at any time the motor be loaded beyond its capacity at its fixed working speed the shafts will be uncoupled and the motor will then run light and accelerate its speed until it has reached its normal working condition and stored power in the fly-wheel or other moving parts, when it will again be coupled in the manner described.

When a variable-speed motor is used, it will be clear that the vehicle may be controlled by simply varying the speed of the motor, for if the motor be slowed down below a certain speed the automatic uncoupling will take place and the vehicle be brought to a standstill, and as the motor may continue to run it will be ready for use immediately its speed is brought up to the point necessary to effect the automatic coupling of the motor and power-transmitting shafts.

To insure the moving of the weighted arms of the two levers 21 and their connected parts in unison, a ring 31 is loosely mounted on the hub of the fly-wheel 18, (see Fig. 3,) so as to turn freely thereon, said ring 31 being connected with the levers 21 by links 32, as clearly shown in Fig. 2. In order to prevent backward motion of the clutch-wheel 25 relative to the other parts, we provide pawls 33, pivoted on the said clutch-wheel 25, the upper two of which pawls will always engage a ratchet-ring 34, mounted on a suitable stationary part, and so lock the parts against backward movement when the motor is at rest; but when the motor is running said pawls 33 will be held out by centrifugal force, and the pawls will then run noiselessly. If desired, springs may be used to keep the pawls in engagement with the ratchet-ring; but in such event the apparatus would be somewhat noisy, owing to the trailing of the pawls over the ratchet-teeth, and we prefer, therefore, the loosely-mounted pawls.

It is desirable that the action of the clutch be rapid when once set into operation and at the same time that it and its operating parts be not too sensitive to the action of centrifugal force, in order that the interval between engagement and disengagement of the clutch may be of considerable duration, or, in other words, an automatic differential operation of the clutching devices is desired instead of the regular movements which occur in the ordinary type of centrifugal clutch. To accomplish this result, we provide retarding or temporary locking means for the clutch mechanism, such locking means consisting in the present instance of the spring-pawls 35, which are secured to the rim of the fly-wheel 18 and engage notches 36 in the bell-crank levers 21 when the weighted arms of said levers are in either of their extreme positions, and thus retard or temporarily lock said arms against movement by the yielding hold which said springs have on the said levers. It will be apparent that when thus temporarily locked the said levers 21 are less sensitive to centrifugal action or to the pull of the springs 28, and it will also be clear that when the centrifugal force is sufficient to overcome the yielding hold which the spring-pawls 35 have on said levers 21, due to the spring-holding power of said pawls, the latter will yield and the weighted levers 21 move very quickly to couple or uncouple the motor and driven shaft, as the case may be. This retarding device is effectual, not only in lengthening the interval between the coupling and uncoupling action of the parts, but in also insuring a rapidity of action of the clutch mechanism when it starts and a quicker change from working connection of the motor and driven shaft, or vice versa, than would otherwise be secured.

The power-transmitting shaft 26, to which reference has been made, is in the present instance connected to a torsional transmitting-spring 37 by means of a knuckle-joint 38, the other end of said spring 37 being secured by a similar joint 39 to the driving pinion-shaft 40. The said spring 37 is preferably provided with a centrally-placed rod 41, which is free to turn and slide in the wrist member of the joint 38, but is secured rigidly to the wrist member of the other joint 39, said rod serving to maintain the spring 37 in alinement or to stiffen it against lateral distortion, but without interfering with its torsional movements in transmitting power from the motor-shaft 17 to the pinion-shaft 40. The said rod 41 may, if desired, be omitted, as the spring 37, if of sufficient strength and rigidity, may be secured directly to the motor-shaft and the driven part. This arrangement of spring-power-transmitting shaft prevents any sudden jerking of the vehicle by reason of the sudden coupling of the motor-shaft and the power-transmitting shaft, as would be the case if provision were not made to obviate it. Furthermore, since the pawl-and-ratchet mechanism 33 34 prevents backward movement of the clutch-wheel 25 the said spring 37 may remain under torsion and power be stored up therein, which will be given up to the driven part when the vehicle is started.

The shaft 40, which, as stated, is connected with the power-transmitting shaft 26 through the joint 39, has its bearing in an eccentric block or bushing 42, mounted in a housing or casing 43, said block or bushing being provided with an arm or lever 44, by means of which the said block or bushing may be rotated in its casing 43 and the eccentrically-placed shaft 40 thus be thrown from one position to another. (See Fig. 5.) Said shaft 40 carries at its inner end the pinion 45, which may be thrown into engagement with either of the two bevel driving-gears 46 47 by means of the arm or lever 44 to provide for driving the vehicle either forward or backward, the gear 46 being shown in the drawings as engaged by the pinion 45 for forward movement of the vehicle. Said gears 46 47 are bolted to and carried by a wheel or carrier 48, mounted on a sleeve 49, encircling the abutting ends of the two-part rear or driving axle 14 and turning freely thereon. Keyed to the inner ends of the two-part driving-axle 14 are two bevel gear-wheels 50 51, which are locked in driving connection with the wheels or carrier 48 by means of pinions 52, carried by radial stub-shafts 53, preferably four in number. Said pinions 52 form a differential-gear connection between the driving-gears 46 and 47 and the bevel gear-wheels 50 51, so that the two-part shaft or axle 14 will receive motion therefrom, and yet the two members thereof will be free to move independently of each other in turning corners, as is customary in vehicles of this class in which compensating gears are used.

From the foregoing it will be seen that we provide a very advantageous motor construction for automobiles or power-driven vehicles, for the reason that by means of the automatic differential-clutch mechanism the motor may be run at slow speed without starting the carriage and may then be speeded up until it reaches a certain predetermined rate of speed, when it will be thrown into clutch connection with the carriage-driving mechanism and drive the vehicle, and thus the wagon may be controlled by merely varying the speed of the motor, and this operation, where a variable-speed motor is used, may be found desirable. Furthermore, the carriage may slow down because of an overload; but the motor being automatically uncoupled from the driving mechanism will continue to run, and when relieved of its load by the stopping of the carriage and the automatic uncoupling of the parts will speed up and store power in its fly-wheel or other moving parts and as soon as it attains its normal or working speed will be automatically coupled with the driving mechanism and start the carriage, this provision for alternate coupling and uncoupling enabling the motor to drive a much heavier load up a hill or through a miry road than would otherwise be possible, the vehicle at such times having an intermittent traveling movement, as will be understood.

The elastic or flexible power-transmitting device between the motor and the driven part is of importance for the reason that it prevents wrenching or straining of the parts and jerking of the carriage when the motor is suddenly coupled, the torsional spring, which forms part of the power-transmitting connection, taking up the sudden shock when the motor is coupled. In addition to the action of the spring in preventing undue strain it serves to store up power, for since it is locked against backward movement it may be left under considerable tension when the carriage is brought to a standstill, and upon starting the carriage it will give up the power stored therein, thus giving an easy starting motion and relieving the motor to some extent of the strain of starting.

The arrangement of reversing and driving gears shown is simple, compact, and effective, the parts being closely housed in proximity to each other and so arranged that the carriage may be reversed with ease and rapidity. The mounting of the bevel driving-gears, which mesh with the driving-pinion on the power-shaft relative to the bevel-gears carried by the two-part driving shaft or axle, is a particularly strong and effective way of securing such parts in working relation, so as to provide for uniform speed of the driving-wheels of the vehicle or for the differential speed necessary at times in the practical roadwork of automobiles.

We do not wish to be understood as limiting our invention to the details of construction herein shown and described, as we have merely illustrated and described a convenient embodiment of our invention, which may be varied widely within the range of mechanical skill without departing from the spirit of our invention. For example, instead of the torsional coil-spring herein shown and described a volute or other form of spring might be employed as a power-transmitting spring, forming part of the driving connections between the centrifugal clutch and the driving-gearing of the vehicle. It will be apparent also that the driving mechanism which we have shown and described in connection with an automobile or road vehicle may, if desired, be used in connection with any driven shaft for doing mechanical work—as, for example, with the driving or propeller shaft of a boat or launch, which when driven by power becomes, in a sense, a motor-vehicle. In fact, the devices hereinbefore described are very well adapted for such use, and we consider any and all such applications of our novel devices and combinations herein set forth to be within the scope of our invention.

Having thus described our invention, we claim and desire to secure by Letters Patent—

1. In a motor-vehicle, the combination with a motor, of a driving-axle, means for coupling said motor and said axle, and centrifugally-operated means to automatically actuate said coupling means when the motor reaches a predetermined speed.

2. In a motor-vehicle, the combination with a motor, of driving-wheels for said vehicle, means for coupling said motor with said wheels, centrifugally-operated devices to actuate said coupling means when the motor reaches a predetermined speed, and means for temporarily locking or retarding the action of said centrifugally-operated devices.

3. In a motor-vehicle, the combination with a motor, of a clutch member connected therewith and driven thereby, a driving-axle, a complementary clutch member connected with said axle, and centrifugally-operated devices to throw said clutch members into engagement and couple said motor and axle when the motor reaches a predetermined speed.

4. In a motor-vehicle, the combination with a motor, of a clutch member driven thereby, a driving-axle, a complementary clutch member connected with said axle, means to normally disengage said clutch members, and centrifugally-operated devices to throw said clutch members into engagement and couple said motor and driving-axle when the motor reaches a predetermined speed.

5. In a motor-vehicle, the combination with a motor, of clutch-shoes carried by the motor-shaft, a driving-axle, a power-transmitting shaft connected with said axle, a clutch member carried by said power-transmitting shaft, and centrifugally-operated devices to throw said clutch-shoes and member into engagement and couple said motor and driving-axle when the motor reaches a predetermined speed.

6. In a motor-vehicle, the combination with a motor, of a fly-wheel on the shaft of said motor, clutch-shoes carried by said fly-wheel, a driving-axle, a power-transmitting shaft connected with said axle, a clutch member carried by said power-transmitting shaft, and centrifugally-operated bell-crank levers serving to force said clutch-shoes into engagement with said clutch member and couple said motor and driving-shaft when said motor reaches a predetermined speed.

7. In a motor-vehicle, the combination with a motor, of a fly-wheel on the shaft of said motor, clutch-shoes carried by said fly-wheel, driving-wheels for said vehicle, a power-transmitting shaft connected with said wheels, a clutch member carried by said power-transmitting shaft, centrifugally-operated bell-crank levers serving to force said shoes into engagement with said clutch member and connect said motor with said driving-wheels when said motor reaches a predetermined speed, and means for temporarily locking or retarding the movement of said bell-crank levers.

8. In a motor-vehicle, the combination with a motor, of a fly-wheel on the motor-shaft, clutch-shoes carried by said fly-wheel, a driving-axle, a power-transmitting shaft connected with said axle, a clutch member carried by said power-transmitting shaft, centrifugally-operated bell-crank levers pivoted on said fly-wheel, spring connections between said levers and said clutch-shoes, whereby the clutch members will be engaged and the power-transmitting shaft coupled to the motor when the latter reaches a predetermined speed, springs to normally hold said levers in their inner position, and spring-pawls engaging notches in said levers to temporarily lock them in either their inner or outer positions.

9. In a motor-vehicle, provided with driving-wheels, the combination with a motor, an automatically-operating centrifugal clutch, and driving connections, comprising a power-transmitting spring, between said clutch and said wheels.

10. In a motor-vehicle, the combination with a motor, of a driving-axle, an automatically-operating centrifugal clutch, and driving connections, comprising a power-transmitting spring, between said clutch and said driving-axle.

11. In a motor-vehicle, the combination with a motor, of a driving-axle, a centrifugal clutch mechanism, a power-transmitting spring forming part of the connections between said clutch mechanism and said axle, and means to prevent backward movement of said power-transmitting spring when the clutch mechanism is uncoupled therefrom.

12. In a motor-vehicle, the combination with a motor, of a driving-axle, a power-transmitting spring between said motor and said axle, clutch mechanism to couple said motor and power-transmitting spring, centrifugally-operated devices to actuate said clutch mechanism, means for retarding or temporarily locking said centrifugally-operated devices against movement, and means to prevent backward movement of said power-transmitting spring when the clutch is uncoupled.

13. In a motor-vehicle, the combination with a motor, of a driving-axle, a power-transmitting spring between said motor and axle, centrifugally-operated clutch mechanism to automatically couple and uncouple said motor and said power-transmitting spring, means for retarding the action of said clutch mechanism, means for preventing backward movement of said power-transmitting spring when the clutch is uncoupled, and reversing-gearing between said power-transmitting spring and said driving-axle.

14. In a motor-vehicle, the combination with a motor, of a driving-axle, a power-transmitting spring between said motor and axle, an automatic centrifugal clutch to couple said motor and said power-transmitting spring when the motor reaches a predetermined speed, and a ratchet-and-pawl mechanism to prevent backward movement of said power-transmitting spring when the clutching devices are uncoupled.

15. In a motor-vehicle, the combination with a motor, of a power-transmitting spring, an automatic centrifugal clutch connecting said motor with said power-transmitting spring, ratchet-and-pawl devices to prevent backward movement of said power-transmitting spring when the clutch is uncoupled, a driving-axle, driving-gears therefor, and a jointed connection between said power-transmitting spring and said driving-gears.

16. In a motor-vehicle, the combination with a motor, of a power-transmitting spring, a centrifugal clutch to couple the motor-shaft with said power-transmitting spring, means for preventing backward movement of said power-transmitting spring when the clutch is uncoupled, a driving-pinion connected with the said power-transmitting spring, a driving-axle, and gear connections between said driving-pinion and said axle.

17. In a motor-vehicle, the combination with a motor, of a power-transmitting spring, clutch connections between said motor and said spring, a driving-pinion connected with said power-transmitting spring, a two-part driving-axle, driving-gears fixed to said axle, driving connections between said pinion and gears, and means for reversing the rotation of said driving connections.

18. In a motor-vehicle, the combination with a motor, of a power-transmitting shaft, a centrifugal clutch mechanism connecting the motor-shaft with said power-transmitting shaft, a driving-pinion carried by said power-transmitting shaft, a driving-axle, driving-gears for said axle, and means for throwing said driving-pinion into engagement with either one of said driving-gears for forward or backward movement of the vehicle.

19. In a motor-vehicle, the combination with a motor, of a yielding power-transmitting shaft, a centrifugal clutch to automatically couple the motor-shaft with said yielding power-transmitting shaft, means for preventing backward movement of said yielding power-transmitting shaft when the clutch is uncoupled, an eccentric bearing for said power-transmitting shaft, a driving-pinion on said power-transmitting shaft, a two-part driving-axle, driving-gears adapted to be engaged by said driving-pinion, means for throwing said eccentrically-mounted driving-pinion into engagement with one or the other of said driving-gears, and a differential-gear connection between said driving-gears and said two-part driving-axle.

20. In a motor-vehicle, the combination with a motor, of a yielding power-transmitting shaft, a centrifugal clutch to automatically couple and uncouple the motor-shaft and power-transmitting shaft, means for locking said power-transmitting shaft against backward movement when the clutch is uncoupled, a rotatable bearing in which said power-transmitting shaft is eccentrically mounted, a driving-pinion carried by said power-transmitting shaft, a two-part driving-axle, a carrier-wheel loosely mounted on said driving-axle, bevel driving-gears on said carrier-wheel, means for throwing said eccentrically-mounted pinion into engagement with either of said bevel-gears, and compensating-gear connections between said bevel-gears and said two-part axle.

21. In a motor-vehicle, the combination with a motor, a yielding power-transmitting shaft, a centrifugal clutch mechanism to automatically couple said motor and power-transmitting shaft at a predetermined speed of the motor, a two-part driving-axle, a carrier-wheel loosely mounted on said two-part axle, bevel driving-gears mounted on said carrier-wheel, a driving-pinion on said power-transmitting shaft, means for throwing said driving-pinion into engagement with either one of said bevel driving-gears, compensating gears on said carrier-wheel, and fixed gears, on the members of said two-part axle, engaging said compensating gears, to provide for differential speeds of the parts of the axle.

22. In a motor-vehicle, provided with driving-wheels, the combination with a variable-speed motor, of a centrifugal clutch forming part of the connections between said motor and said driving-wheels, said clutch comprising weighted levers for coupling the clutch members by centrifugal action, and springs acting on said levers in opposition to their centrifugal movements, said springs being so connected with said levers that their leverage pull on said springs decreases with the increased tension of the springs at a ratio greater than the ratio of increase of the tension of the springs, whereby the said springs will exert less pull on said levers when the clutch members are in gripping contact than they will when the clutch members are uncoupled.

In testimony whereof we affix our signatures in presence of two witnesses.

THOMAS L. STURTEVANT.
THOMAS J. STURTEVANT.

Witnesses:
M. F. FOURNIER,
W. H. ELLIS.